United States Patent [19]
Fry

[11] Patent Number: 4,546,671
[45] Date of Patent: Oct. 15, 1985

[54] VALVE ACTUATORS

[75] Inventor: Jeremy J. Fry, Bath, England

[73] Assignee: Rotork Controls Limited, United Kingdom

[21] Appl. No.: 490,714

[22] Filed: May 2, 1983

[30] Foreign Application Priority Data

May 12, 1982 [GB] United Kingdom ............... 8213744

[51] Int. Cl.⁴ ............................................. F16H 37/06
[52] U.S. Cl. ......................................... 74/625; 74/670
[58] Field of Search .................. 74/625, 661, 670; 251/130, 14

[56] References Cited

U.S. PATENT DOCUMENTS

| | | | |
|---|---|---|---|
| 2,634,623 | 4/1953 | Kron | 74/625 X |
| 2,694,320 | 11/1954 | Kron | 74/625 |
| 2,703,991 | 3/1955 | Kron et al. | 74/625 |
| 2,745,294 | 5/1956 | Kron | 74/625 |
| 2,775,906 | 1/1957 | Elliott et al. | 74/625 |
| 2,916,947 | 12/1959 | Morrell | 74/625 |
| 2,989,878 | 6/1961 | Denkowski et al. | 74/625 |

FOREIGN PATENT DOCUMENTS 0014240 8/1980 European Pat. Off. .............. 74/625

Primary Examiner—George H. Krizmanich
Assistant Examiner—Dirk Wright
Attorney, Agent, or Firm—Hayes, Davis & Soloway

[57] ABSTRACT

A valve actuator has an electric driving motor for driving an output shaft through reduction gearing and a manual operator for driving the output shaft manually. A drive transfer device for transferring the drive from the electric motor to the manual operating means incorporates an electric switch which is operated by the initial movement of a manual operator of the drive transfer device to cause the motor if rotating to be brought to a stop. Continued movement of the manual operator causes the drive transfer device to transfer the drive to the output shaft from the electric motor to the manual operator. The drive transfer device advantageously includes a clutch between the motor shaft and a worm shaft forming part of the reduction gear. The driven clutch member may form an integral part of a unit which is slidable as a sleeve along the worm shaft but is keyed for rotation to the worm shaft, the unit also having a pinion for meshing with a drive gear forming part of the hand drive.

7 Claims, 3 Drawing Figures

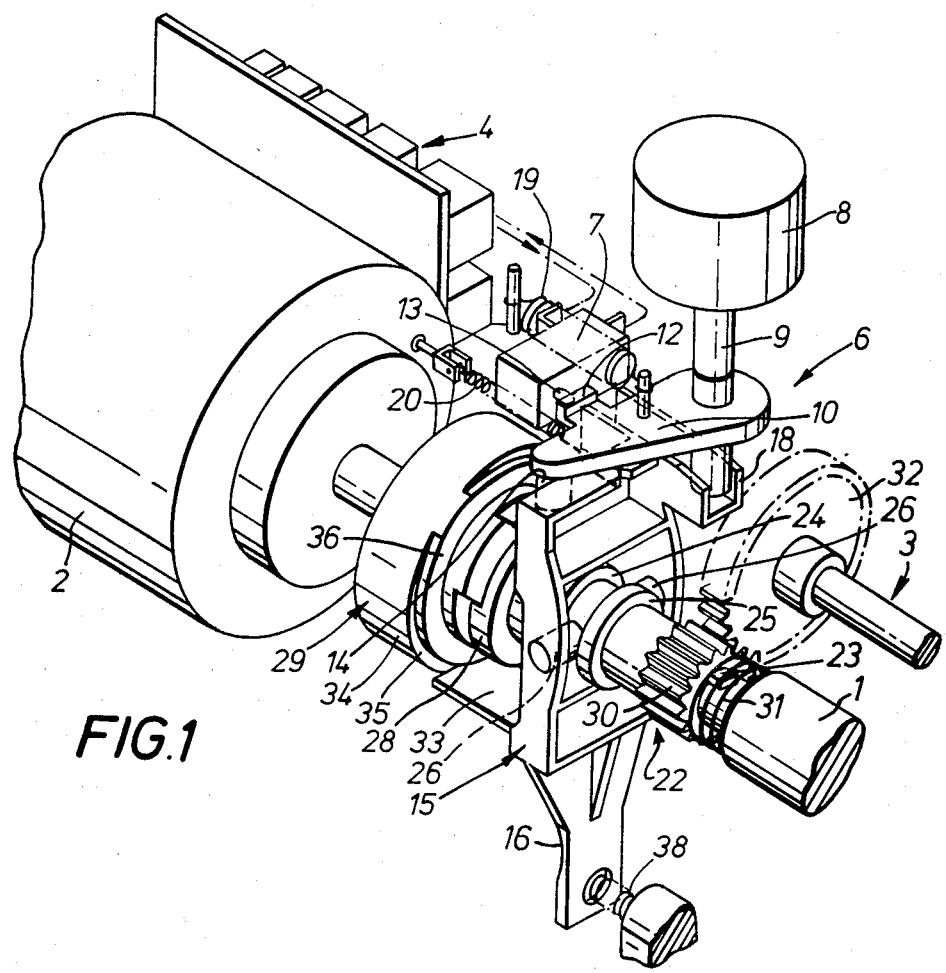
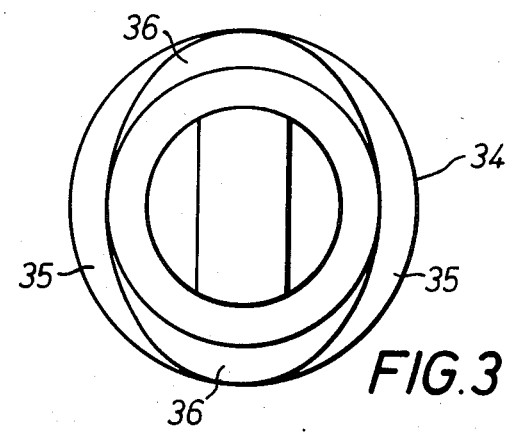

VALVE ACTUATORS

This invention relates to valve actuators.

The invention is more particularly concerned with relatively large sized valve actuators which even at the smaller end of the range are capable of providing a valve operating torque typically of the order of 3 kg.m and at the larger end of the range are capable of providing a valve operating torque of the order of 1000 kg.m. Such valve actuators find wide application for example in the thermal power generation, gas storage and oil storage industries as well as having marine, penstock and other specialised applications.

Such valve actuators generally have an output shaft driven by an electric motor through reduction gearing, e.g. worm and worm-wheel gearing, and which can rotate the output shaft in either direction to open or close a valve drivingly connected by its valve stem to the output shaft. Also in such valve actuators it is common practice to provide a handwheel for rotating the actuator output shaft in order to open and close the associated valve manually. A so-called hand/auto mechanism is provided and comprises a manual operator (e.g. a hand lever or hand knob) for actuating a drive transfer device for transferring from auto (i.e. motor) drive to hand drive.

It is customary for long-term reliability reasons to provide the drive transfer device on the low speed side of the acutator gearing, i.e. on the side remote from the motor, and the drive transfer device therefore has to have components which will withstand the high torques on the low speed side.

The object of the present invention is to provide an actuator which is designed so that the drive transfer device can be reliably provided on the high speed side of the gearing and can therefore be made of "low torque" components which can be produced much more economically than "high torque" components.

According to the invention there is provided a valve actuator comprising an output shaft drivingly connectable to a valve, a motor for driving the output shaft, reduction gearing through which the output shaft is driven by the motor, manual operating means for driving the output shaft manually, a drive transfer device for transferring the drive for the output shaft from the motor to the manual operating means, and a manual operator for actuating the drive transfer device, wherein a control device is arranged to be operated by the initial movement of the manual operator to cause the motor if rotating to be brought to a stop, continued movement of the manual operator causing the drive transfer device to disengage the drive from the motor and to engage the manual operating means.

Preferably the motor is an electric motor and has an electrical braking system such as a regenerative braking system, and said control device is an electric switch.

The drive transfer device advantageously includes a unit which is slidable as a sleeve along a drive transmission shaft in the drive from the motor to the output shaft and is keyed for rotation to the transmission shaft, the unit having the driven member of a clutch through which the drive is transmitted from the motor and also having a gear member for meshing with a drive gear forming part of the manual operating means.

The transfer from auto to hand drive is brought about by sliding the unit along the shaft to disengage the clutch and automatically engage the gear member with the drive gear. The movement of the unit along the shaft is sufficient to ensure that the clutch is completely disengaged before the gear member starts to mesh with the drive gear and vice versa.

The clutch is advantageously made from plastics material and is of the dog type.

To displace the unit along the worm shaft the drive transfer device may have a yoke which is caused to pivot by operating the manual operator and which has pegs for engaging at diamtertrically opposite positions in a circumferential groove of said unit. The yoke can also advantageously be made from plastics material and be formed with an integral hold-off finger which when the clutch has fully disengaged comes into engagement with a face of the driving member of the clutch to hold the clutch disengaged against a spring force biasing it to its engaged position.

The face of the clutch member that the hold-off finger engages is advantageously scrolled, i.e. has one or more curved shoulders extending to the edge of the face between different height lands on the face. Hence if the finger is resting on one of the lands, start up of the motor and hence rotation of the driving clutch member will cause the finger to be guided off the face of the clutch member to cause the clutch to re-engage under the spring bias.

The invention will now be further described by way of example with reference to the accompanying drawings in which:

FIG. 1 shows a perspective view of the hand/auto mechanism;

FIG. 3 shows a view on the face of one clutch member of the mechanism.

Figure 2:
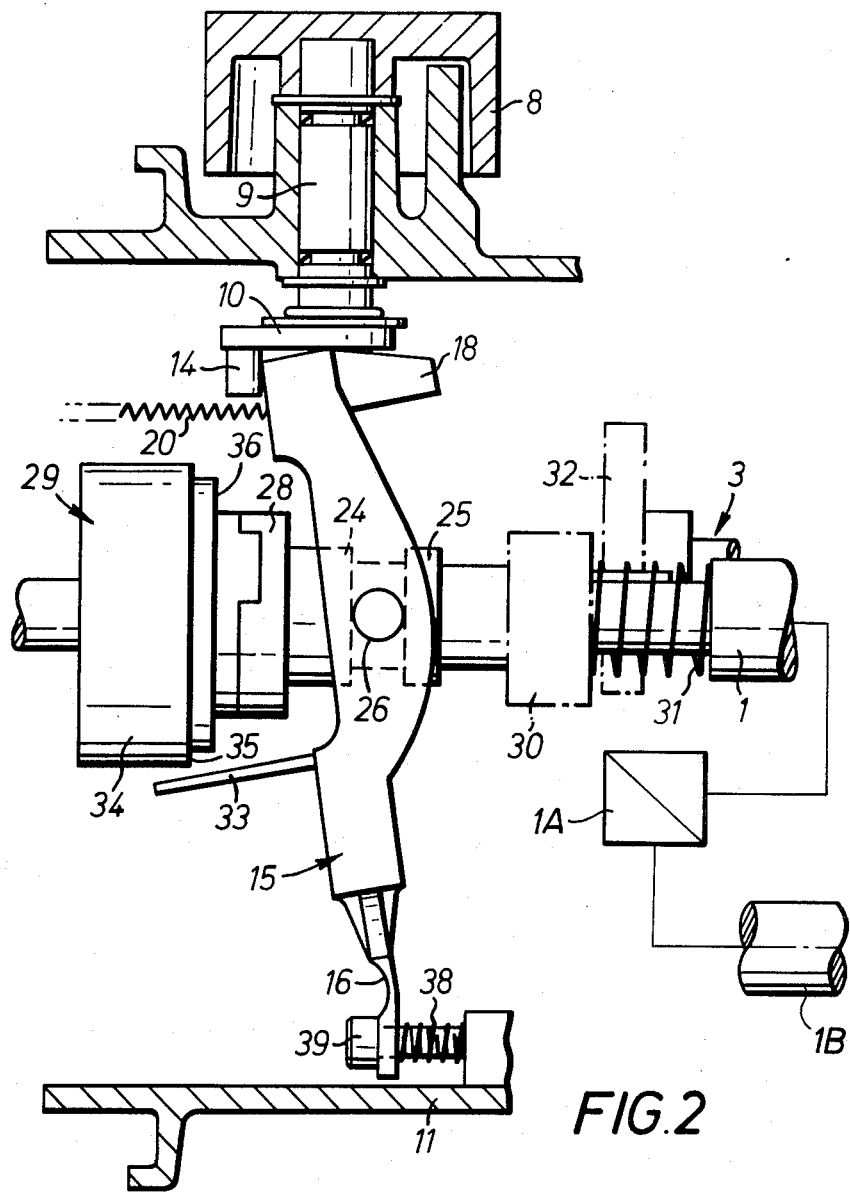
FIG. 2 shows a side view of a part of the mechanism.

In the drawings of the worm shaft of a valve actuator is shown at 1 which, as shown diagrammatically in FIG. 2, via a worm wheel 1A is arranged to drive the actuator output shaft 1B. In use of the actuator its output shaft is drivingly connected to the stem of a valve.

The worm shaft 1 can either be driven by an electric motor 2 or by a hand drive 3 which leads from a handwheel (not shown).

The motor 2 has a motor control unit 4 providing regenerative electric braking of the motor for example by shorting the armature or passing the armature generated current through a resistor whilst retaining the motor field.

A hand/auto mechanism 6 is provided which includes an electric switch 7 which when actuated with the motor 2 rotating causes the control system 4 to bring the motor 2 to a rapid stop under regenerative braking.

The hand/auto mechanism 6 has a manual operator in the form of a knob 8 which is mounted on the upper end of a shaft 9. The shaft 9 is rotatably mounted in the actuator housing and carries at its lower end an arm 10. The knob 8 is rotated anti-clockwise as shown in the drawing about the axis of shaft 9 to transfer the drive from auto to hand and this causes an angular displacement of the arm 10.

The arm 10 has a switch actuator 12 which in the auto position holds in a switch button 13. As soon as the the knob 10 is rotated anti-clockwise the actuator 12 moves away from the switch 7 and switch button 13 is released to cause the motor to be brought to a rapid stop as described above.

The arm 10 at its outer end has a post 14 which butts against the upper end of a yoke 15. The yoke 15 which is formed from plastics material is mounted at its lower end on the actuator housing 11 by a bolt 39 which freely passes through the lower end of the yoke 15 and is screwed into the housing 11. The lower end of the yoke is urged against the head of the bolt 39 by a spring 38. The yoke 15 immediately above its mounting is formed with a portion of reduced thickness to provide a flexible hinge 16 for the yoke 15 so that the yoke effectively pivots between the positions shown in FIGS. 1 and 2. Thus anti-clockwise rotation of the arm 10 will cause clockwise rotation as seen in FIG. 2 of yoke 15 about hinge 16. The movement of the yoke is guided by the lower projecting end of the shaft 9 engaging in a channel formation 18 integral with the yoke 15.

The arm 10 (and hence the shaft 9 and knob 8) has a return spring 19. Thus when the knob 8 has been fully operated it can be released and will be returned by spring 19 to its initial position. The yoke 15 also has a return spring 20.

Slidably mounted on a reduced diameter portion of worm shaft 1 is a unit 22 which is formed from plastics material and which is keyed for rotation to the shaft 1 by key 23 or splines. The unit is provided with a circumferential groove defined between a pair of collars 24 and 25. The yoke 15 has a pair of pegs 26 which locate at diametrical opposite positions in the groove. Thus when the yoke is pivoted about hinge 16 it slides the unit 22 along the shaft 1 by reason of the pegs engaging a side of the groove, i.e. a face of one of the collars.

The unit 22 carries at one end a driven clutch member 28 of a dog clutch 29 and at its other end a pinion 30, the unit being urged by spring 31 into clutch engagement. Clockwise rotation of the yoke 15 will cause clutch disengagement and then meshing of pinion 30 with drive gear 32 of the hand drive 3.

The yoke 15 has a hold-off finger 33 which when the clutch 29 has disengaged abuts against the face of the driving clutch member 34 as shown in FIG. 1 to hold the clutch disengaged against the bias of springs 20 and 31. The face of the driving clutch member 34 engaged by the finger 33 is scrolled as best seen in FIG. 3. That is to say lands 35 and 36 are separated by a curved shoulder whose ends are at the edge of the face.

When the yoke 15 rotates clockwise the finger 33 is brought up against the periphery of the clutch member 34 and continued rotation of yoke 15 causes the finger 33 to flick on to face of clutch member 34. Depending on the rotational position of the member 34 the finger 33 either comes to rest aginst the upper land 36 or lower land 35 of the face of the clutch member 34.

When the motor 2 is restarted, if finger 33 is on the lower land 35 it is immediately guided off the face by the curved shoulder allowing the yoke 15 to rotate anticlockwise to 'auto' position. If the finger 33 is on the upper land 35 the initial rotation of the motor will cause finger 33 to slip on to the lower land 35 and then further rotation will cause the finger to be guided off the face as previously. This displacement of the finger 33 will happen irrespective of the direction of motor rotation, since the curved shoulder is in the form of two curves occupying each half of the face of the clutch member 34 and each curve extending right up to the edge of the face.

The finger 33 is formed integrally with the yoke 15 and is therefore of plastics material so that it is inherently flexible. Thus as the finger engages the shoulder on the face of the clutch member 34 it will flex relatively to the rest of the yoke 15 and so permit itself to be guided off the face of the clutch member 34.

The yoke 15 in the 'auto' position of the mechanism abuts against the post 14 which thus acts as a limiting stop for the yoke so that it is in a predetermined position.

When disengaging the clutch 29 it is desirable that clutch rotation ceases before it has disengaged significantly, otherwise the dogs being of plastics material can have their corners sheared off. This cessation is ensured by the regenerative braking system of the motor initiated by operation of the electric switch 7 upon initial movement of the operating knob 8. It is also necessary that re-engagement of the clutch takes place in the shortest time, otherwise the dogs can start transmitting torque before fully engaged and the resulting friction will prevent the springs 31 and 20 from moving the clutch into full engagement and the build up of torque will result in failure of the partly engaged dogs. Making the yoke 15 and the drive transfer unit 22 from plastics material ensures that they have low inertia so that they will move very rapidly back to the 'auto' position.

As previously described, the yoke 15 is spring urged by spring 38 against the head of the bolt 39. The bolt 39 is adjustable by screwing it into and out of the housing 11 to vary the position of the lower end of the yoke 15. Hence in the auto position, with the upper end of the yoke 15 urged against post 14 by spring 20 the bolt 39 can be adjusted to adjust the position of the lower end of the yoke 15 so that the pegs 26 are centred between and therefore out of engagement with the collars 24 and 25 of the unit 22 to prevent wear on the pegs 26 when the unit 22 is rotated in the 'auto' position.

In certain instances it may be advantageous to introduce a further reduction gear, such as a spur reduction gear in the drive from the electric motor. This may be positioned between the shaft of the electric motor 2 and the clutch 29.

I claim:

1. A valve actuator comprising an output shaft drivingly connectable to a valve, an electric motor for driving the output shaft, a drive transmission shaft through which the drive from said motor to said output shaft is transmitted, a reduction gearing connected between said drive transmission shaft and said output shaft, manual operating means for driving the output shaft manually, a drive transfer device for transferring the drive for the output shaft from the motor to the manual operating means, said drive transfer device including a clutch disposed in said drive transmission shaft on the high speed side of said reduction gearing for disengaging the drive from the motor and a gear for engaging the manual operating means to drivingly connect the manual operating means to the transmission shaft on the high speed side of the reduction gearing, the driven member of said clutch and said gear forming part of a unit which is slidable along said transmission shaft and keyed for rotation to it and which is biased to the clutch engaging position, and a manual operator for operating the drive transfer device to transfer the drive from the motor to the manual operating means, said manual operator comprising a pivotable yoke which engages said unit so that, upon pivotable movement of said yoke, said unit is caused to slide along said transmission shaft and which is provided with a hold-off finger which, when the clutch has fully disengaged, comes into engagement with a face of the driving member of the clutch to hold the clutch disengaged against the spring bias.

2. A valve actuator according to claim 1 wherein said finger is formed integrally with said yoke and is formed from plastics material so that it is inherently flexible.

3. A valve actuator according to claim 1 wherein said face of the driving member of the clutch has at least one curved shoulder extending to the edge of the face between different height lands on the face, whereby when the driving member of the clutch is rotated by the electric motor the finger is guided off the face of the driving clutch member to permit the clutch to re-engage under the spring bias.

4. A valve actuator comprising an output shaft drivingly connectable to a valve, an electric motor for driving the output shaft, an electric braking system for said motor, a drive transmission shaft through which the drive from said motor to said output shaft is transmitted, a reduction gearing connected between said drive transmission shaft and said output shaft, manual operating means for driving the output shaft manually, a drive transer device for transferring the drive for the output shaft from the motor to the manual operating means said drive transfer device including a clutch disposed in said drive transmission shaft on the high speed side of said reduction gearing for disengaging the drive from the motor and a gear for engaging the manual operating means to drivingly connect the manual operating means to the transmission shaft on the high speed side of the reduction gearing, a manual operator for operating the drive transfer device to transfer the drive from the motor to the manual operating means and an electric switch operated by the initial movement of the manual operator to energize the electric braking system before the clutch disengages the drive from the motor.

5. A valve actuator according to claim 4, wherein said clutch comprises a dog clutch and the driven member of said clutch and said gear for engaging the manual operating means form part of a unit made of plastics material and which is slidable along said drive transmission shaft and keyed for rotation to said drive transmission shaft.

6. A valve actuator comprising an output shaft drivingly connectable to a valve, an electric motor for driving the output shaft, a drive transmission shaft through which the drive from said motor to said output shaft is transmitted, a reduction gearing connected between said drive transmission shaft and said output shaft, manual operating means for driving the output shaft manually, a drive transfer device for transferring the drive for the output shaft from the motor to the manual operating means, said drive transfer device including a clutch disposed in said drive transmission shaft on the high speed side of said reduction gearing for disengaging the drive from the motor and a gear for engaging the manual operating means to drivingly connect the manual operating means to the transmission shaft on the high speed side of the reduction gearing, the driven member of said clutch and said gear forming part of a unit which is slidable along said transmission shaft and keyed for rotation to it, and a manual operator for operating the drive transfer device to transfer the drive from the motor to the manual operating means, said manual operator comprising a pivotable yoke which has pegs locating in a circumferential groove of said unit for effecting sliding movement of said unit upon pivotal movement of said yoke, the width of the groove being larger than the width of the pegs, and which is spring biased against a stop when the clutch is in its engaged position to connect the drive from the motor to the output shaft, and which is bodily adjustable so that when the yoke is against said stop said pegs can be positioned so that they are out of contact with the sides of said groove.

7. A valve actuator according to claim 6, wherein said yoke is formed from plastics material.

* * * * *